United States Patent
Zhang et al.

(10) Patent No.: US 10,594,832 B2
(45) Date of Patent: Mar. 17, 2020

(54) METHOD AND DEVICE FOR ESTABLISHING RELAY CONNECTIONS IN D2D BROADCAST COMMUNICATION-BASED NETWORK

(71) Applicant: Samsung Electronics Co., Ltd., Suwon-si, Gyeonggi-do (KR)

(72) Inventors: Shichang Zhang, Beijing (CN); Lixiang Xu, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 15/555,355

(22) PCT Filed: Mar. 18, 2016

(86) PCT No.: PCT/KR2016/002780
§ 371 (c)(1),
(2) Date: Sep. 1, 2017

(87) PCT Pub. No.: WO2016/148543
PCT Pub. Date: Sep. 22, 2016

(65) Prior Publication Data
US 2018/0041605 A1 Feb. 8, 2018

(30) Foreign Application Priority Data

Mar. 18, 2015 (CN) ............... 2015 1 0119467
May 15, 2015 (CN) ............... 2015 1 0251278

(51) Int. Cl.
*H04L 29/08* (2006.01)
*H04W 76/14* (2018.01)
(Continued)

(52) U.S. Cl.
CPC ............... *H04L 67/32* (2013.01); *H04W 4/70* (2018.02); *H04W 76/14* (2018.02); *H04W 8/005* (2013.01); *H04W 88/04* (2013.01)

(58) Field of Classification Search
CPC ........ H04L 5/14; H04W 24/02; H04W 48/20; H04W 72/0446; H04W 84/005; H04W 84/047; H04W 88/12; H04W 92/20
(Continued)

(56) References Cited

U.S. PATENT DOCUMENTS

2008/0025280 A1 1/2008 Hsu et al.
2010/0272009 A1* 10/2010 Cheng ................. H04W 52/346
370/315
(Continued)

FOREIGN PATENT DOCUMENTS

KR 10-2015-0018464 A 2/2015
WO 2014/025238 A1 2/2014

*Primary Examiner* — David R Lazaro
*Assistant Examiner* — Berhanu Shitayewoldetadik
(74) *Attorney, Agent, or Firm* — Jefferson IP Law, LLP

(57) ABSTRACT

A method for establishing a relay connection in a device to device (D2D) broadcast communication-based relay network is provided. Relay node user equipment (RNUE) transmits a relay broadcast (RBC) message based on indicator of a Donor evolved Node B (DeNB), detects a relay request (RRQ) message coming from the UU in corresponding resources, confirms the relay connection with a corresponding UU by using a relay response (RRP) message. Based on the received RBC message, standard definition, or pre-configuration, the UU may determine transmission resources of the RRQ message, so as to establish a connection with the RNUE.

20 Claims, 3 Drawing Sheets

(51) Int. Cl.
*H04W 4/70* (2018.01)
*H04W 8/00* (2009.01)
*H04W 88/04* (2009.01)

(58) Field of Classification Search
USPC .......................................................... 709/227
See application file for complete search history.

(56) References Cited

U.S. PATENT DOCUMENTS

| | | | | |
|---|---|---|---|---|
| 2011/0310792 A1* | 12/2011 | Lee | .................... | H04B 7/15542 |
| | | | | 370/315 |
| 2011/0312328 A1* | 12/2011 | Choi | .................... | H04L 5/0062 |
| | | | | 455/450 |
| 2012/0142352 A1* | 6/2012 | Zhang | ............... | H04W 36/0072 |
| | | | | 455/436 |
| 2012/0172038 A1* | 7/2012 | Kim | ...................... | H04W 24/02 |
| | | | | 455/434 |
| 2012/0207049 A1* | 8/2012 | Du | ......................... | H04W 48/14 |
| | | | | 370/252 |
| 2013/0343259 A1* | 12/2013 | Barrett | .................. | H04L 1/0041 |
| | | | | 370/312 |
| 2013/0343262 A1* | 12/2013 | Barrett | .................... | H04W 4/00 |
| | | | | 370/315 |
| 2014/0020031 A1* | 1/2014 | Barrett | ................ | H04W 72/005 |
| | | | | 725/62 |
| 2014/0044036 A1* | 2/2014 | Kim | .................. | H04W 72/0446 |
| | | | | 370/315 |
| 2014/0329535 A1* | 11/2014 | Sadiq | .................... | H04W 76/14 |
| | | | | 455/452.2 |
| 2015/0029866 A1* | 1/2015 | Liao | ....................... | H04W 4/023 |
| | | | | 370/241 |
| 2015/0029886 A1* | 1/2015 | Seo | ........................ | H04J 11/005 |
| | | | | 370/252 |
| 2015/0045033 A1 | 2/2015 | Kim et al. | | |
| 2015/0049663 A1* | 2/2015 | Mukherjee | ............ | H04W 16/26 |
| | | | | 370/315 |
| 2015/0223204 A1* | 8/2015 | Cao | ........................ | H04W 4/06 |
| | | | | 370/329 |
| 2016/0219541 A1* | 7/2016 | Chatterjee | ........... | H04W 72/048 |
| 2016/0302249 A1* | 10/2016 | Sheng | .................... | H04W 4/70 |
| 2017/0006651 A1* | 1/2017 | Jung | ..................... | H04W 48/16 |
| 2017/0048878 A1* | 2/2017 | Zhang | .................. | H04W 76/36 |
| 2017/0127287 A1* | 5/2017 | Fujishiro | ................. | H04W 4/70 |
| 2017/0142653 A1* | 5/2017 | Qi | ........................... | H04B 7/2606 |
| 2017/0142741 A1* | 5/2017 | Kaur | ................... | H04W 56/002 |
| 2017/0164332 A1* | 6/2017 | Kim | ...................... | H04W 76/10 |
| 2017/0374569 A1* | 12/2017 | Lee | ....................... | H04L 1/0038 |
| 2018/0027429 A1* | 1/2018 | Li | .......................... | H04W 40/22 |
| | | | | 455/426.1 |
| 2018/0027475 A1* | 1/2018 | Li | ........................... | H04W 8/24 |
| | | | | 455/426.1 |
| 2018/0041605 A1* | 2/2018 | Zhang | .................... | H04W 4/70 |
| 2018/0054804 A1* | 2/2018 | Luo | ...................... | H04W 72/04 |
| 2018/0092017 A1* | 3/2018 | Freda | ................... | H04W 76/14 |

* cited by examiner

[Fig. 1]
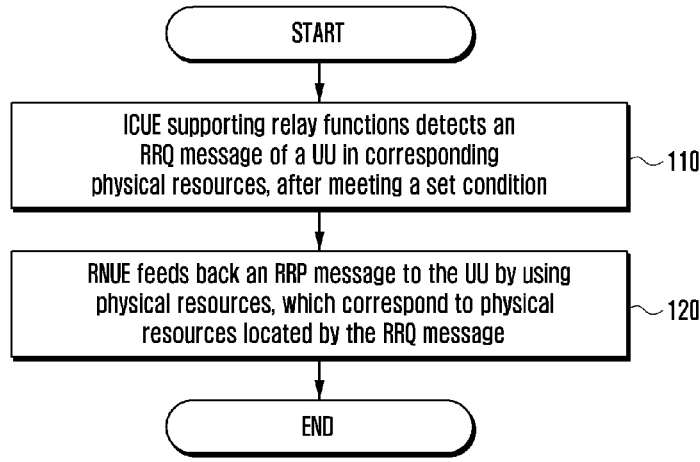
[Fig. 2]
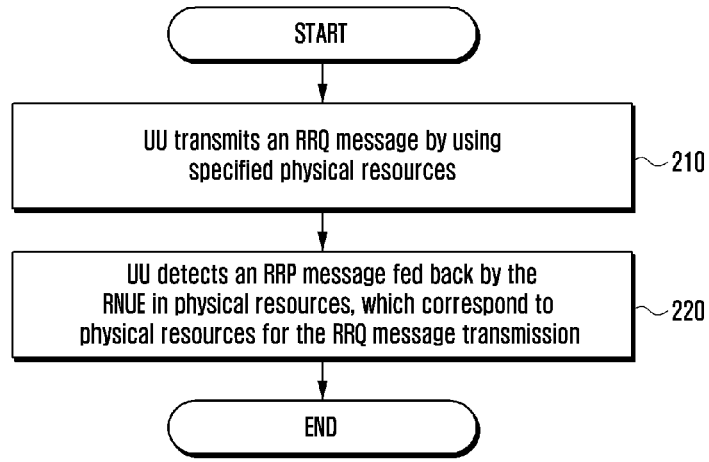
[Fig. 3]
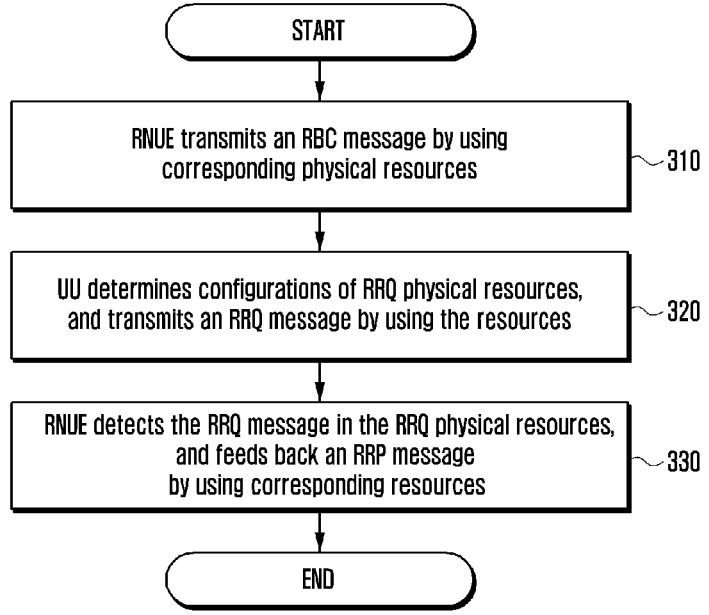

[Fig. 4]
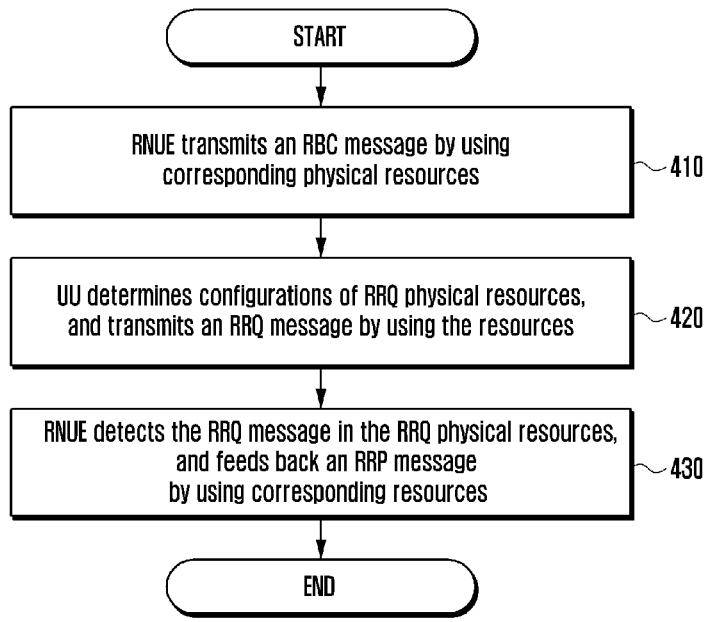
[Fig. 5]
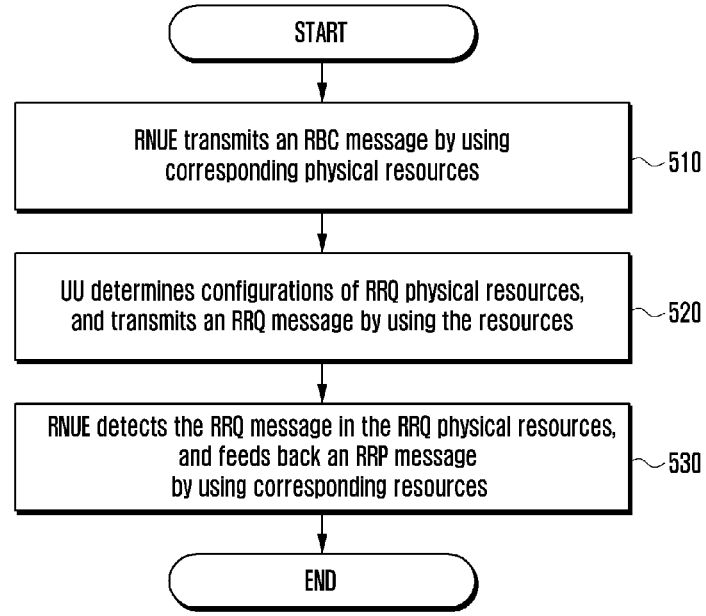

[Fig. 6]
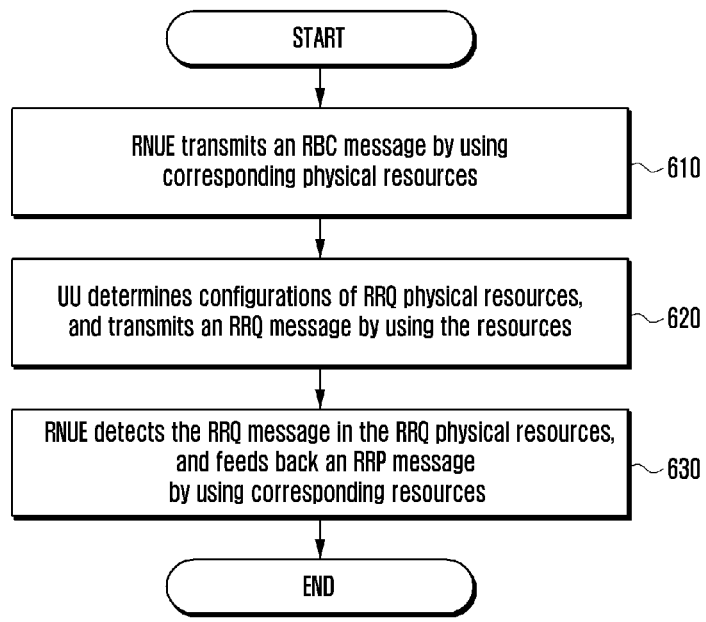

METHOD AND DEVICE FOR ESTABLISHING RELAY CONNECTIONS IN D2D BROADCAST COMMUNICATION-BASED NETWORK

TECHNICAL FIELD

The present disclosure relates to mobile communication technologies, and more particularly, to a method and device for selecting a relay node (RN) in a device to device (D2D) broadcast communication-based relay network.

BACKGROUND ART

At present, D2D communication technologies have been accepted by third generation partnership project (3GPP) standards, due to huge potential value thereof in public safety field and ordinary civil communication field. Besides, standardization of partial function of the D2D communication technologies have already been implemented by 3GPP Rel-12, which includes mutual discovery of D2D terminals in an in coverage (IC) scene, and broadcast communication among D2D terminals in the IC scene, a partial coverage (PC) scene and an out of coverage (OC) scene.

At present, 3GPP Rel-12 standard has defined two kinds of D2D broadcast communication modes, which may be referred to as Mode 1 and Mode 2 for convenience. Mode 1 requires that a user equipment (UE) transmitting the D2D broadcast communication must be under the coverage of a cellular network, that is, an ICUE. The UE may obtain configuration information of D2D scheduling assignment (SA) resource pool of Mode 1, by receiving system broadcast signaling from an evolved node B (eNB), which may include an SA period and positions of subframes, which are used for transmitting the SA within each period. When there is data in a UE supporting broadcast communication Mode 1, the UE may apply to an eNB for dedicated Mode 1 communication resources, by using a specific buffer status report (BSR). Subsequently, the UE may detect D2D Grant of the eNB before each SA period, and obtain location of resources for transmitting the SA and data within the SA period. In Mode 1, resource conflict among different UEs may be avoided, by using centralized control of the eNB.

A UE transmitting the D2D broadcast communication under Mode 2 may be an ICUE, or a UE out the coverage of a cellular network (OCUE). The ICUE may obtain configurations of an SA resource pool and a corresponding data resource pool under Mode 2, by receiving eNB system broadcast signaling. The ICUE may further randomly select resources, which are used for transmitting the SA and corresponding data within each SA period. The OCUE may determine configurations of an SA resource pool and a corresponding data resource pool under Mode 2, by using pre-configured information. Resource selection mode of the OCUE is the same as that of the ICUE. In the PC scenario, resource pool configuration under Mode 2, which is pre-configured by the OCUE, is relevant to carrier frequency of a cell located by an ICUE participating in the D2D broadcast communication, system bandwidth, and/or, time division duplexing (TDD) configuration.

In the PC scenario, to implement frequency synchronization and subframe-level time synchronization between ICUE and OCUE, both of which have participated in the D2D broadcast communication, the ICUE transmitting the D2D broadcast communication needs to transmit a D2D synchronization signal (D2DSS) by using cell-configured synchronization resources, when receiving a signaling indicator from an eNB, or when the ICUE is located at the edge of a cell. The D2DSS may include a primary D2DSS (PD2DSS) and a secondary D2DSS (SD2DSS). The PD2DSS may employ a Zadoff-Chu (ZC) sequence with length 62, the root index thereof is 26 and 37. The SD2DSS may employ m sequence with length 62. To implement subframe-level synchronization between foregoing UEs, and to enable the OCUE to obtain information, such as system frame of cell, system bandwidth and TDD configurations, the UE transmitting the D2DSS still needs to transmit a D2D physical sidelink broadcast channel (PSBCH), so as to forward the foregoing information to the OCUE.

DISCLOSURE OF INVENTION

Technical Problem

However, D2D functions already implemented by 3GPP Rel-12 is far from meeting users' requirements. In each subsequent 3GPP version, broad consensus of each current communication terminal manufacture and communication network device manufacture is to further strengthen function framework of D2D. Relay from a D2D broadcast communication-based eNB (Donor eNB, DeNB) in charge of relay service to a UE is one of functions needing to be standardized firstly. Relay refers to forwarding data coming from a transmitting node to a receiving node through an RN. In a downlink communication, the transmitting node may be DeNB, while the receiving node may be a UE (user UE, UU) out the coverage of a cell corresponding to the DeNB, which is just contrary in uplink communication. 3GPP Rel-10 has already defined a fixed RN-based relay mechanism. In the foregoing relay system, position of the RN is fixed, and power may be supplied by cable. RN and UU may communicate with each other by using a wireless interface, which is defined by a long term evolution (LTE) system. In the D2D broadcast communication-based relay system, a certain ICUE supporting relay functions may perform in the role of RN. Besides, based on the consensus achieved in conference RAN#66, the ICUE performing in the role of RN and the UU may communicate with each other, by using the D2D broadcast communication mechanism defined by Rel-12.

Based on the foregoing analysis, it can be seen that there are differences of many aspects between D2D broadcast communication-based relay system and fixed RN-based relay system. Firstly, there may be multiple ICUEs supporting the relay within a cell. Besides, the UU and a relay node user equipment (RNUE) played by ICUE need to transmit data, by using the D2D broadcast communication mechanism. In addition, compared with a fixed RN node, UE may possess characteristics, such as mobility and limited power. The foregoing factors may have an impact on communication mode between RNUE and UU. There is no ideal technical solution at present, which may solve the foregoing problems.

Solution to Problem

Objectives of the present disclosure are to solve one of foregoing technical deficiencies. More particularly, the present disclosure provides a method and device for establishing a relay connection in a D2D broadcast communication-based relay network, which may include as follows.

The present disclosure provides a method for establishing a relay connection in a D2D broadcast communication-based relay network, including:

detecting, by a relay node user equipment (RNUE) supporting relay functions and meeting a set condition, which is in an in coverage (IC) scene, a relay request (RRQ) message transmitted by a user UE (UU) which is out of coverage of a cell corresponding to a Donor evolved Node B (DeNB);

for an accepted RRQ message, transmitting, by the RNUE, a relay response (RRP) message corresponding to the accepted RRQ message to the UU, by using physical resources corresponding to physical resources bearing the RRQ message.

Preferably, meeting the set condition includes:

receiving a relay configuration signaling indicator transmitted by the DeNB, or, a reference signal receiving power (RSRP) received from the DeNB being less than a set threshold, or, receiving a signal from the UU.

Preferably, locations of the physical resources bearing the RRQ message are determined by using the following modes:

indicating, by the RNUE, the locations of the physical resources bearing the RRQ message to the UU; or, pre-specifying or pre-configuring the locations of the physical resources bearing the RRQ message.

Preferably, the RNUE indicates the locations of the physical resources bearing the RRQ message to the UU, by using a relay broadcast (RBC) message.

Preferably, the RBC message is transmitted by using a D2D broadcast communication mode, a D2D broadcast communication resource pool for RBC message transmission belongs to D2D broadcast communication Mode 1, the RNUE determines time-frequency resources for the RBC message transmission in the resource pool, based on signaling transmitted by the DeNB, the resource pool includes a scheduling assignment (SA) resource pool and a physical sidelink shared channel (PSSCH) resource pool.

Preferably, the RBC message is transmitted through a physical sidelink discovery channel (PSDCH), transmission mode of the RBC message is Type 1 or Type 2B, and the RBC message is transmitted for at least three times, the RNUE determines time-frequency resources for RBC message transmission in the resource pool, based on signaling transmitted by the DeNB, and the resource pool is a PSDCH resource pool for the RBC message transmission.

Preferably, the method further includes:

after transmitting the RBC message in a resource pool period, transmitting, by the RNUE, a primary sidelink synchronization signal (PSSS), a secondary sidelink synchronization signal (SSSS) and a physical sidelink broadcast channel (PSBCH) on all the synchronization resources, which are within a same resource pool period.

Preferably, a resource pool for RRQ message transmission is the same as the resource pool for the RBC message transmission, the SA resource pool and the PSSCH resource pool for RRP message transmission, are respectively the same as the SA resource pool and the PSSCH resource pool for the RBC message transmission; and the locations of the physical resources bearing the RRQ message, which are indicated by the RNUE to the UU, are time-frequency resource indicator for transmitting the RRQ message.

Preferably, a resource pool for RRQ message transmission is the same as, or is different from the resource pool for the RBC message transmission, a resource pool for RRP message transmission is the same as the resource pool for the RBC message transmission, and the locations of the physical resources bearing the RRQ message, which are indicated by the RNUE to the UU, are time-frequency resource indicator for transmitting the RRQ message.

Preferably, the method further includes:

before transmitting the RRP message, applying, by the RNUE, to the DeNB for resources used for transmitting uplink data, and enabling the RRP message to carry the time-frequency resource indicator, which is issued by the DeNB and is used for transmitting uplink data.

Preferably, the time-frequency resource indicator used for transmitting uplink data includes uplink SA resources and uplink PSSCH resources, or, the time-frequency resource indicator used for transmitting uplink data includes the uplink PSSCH resources, and the RRP message further includes a modulation mode of the uplink PSSCH.

Preferably, the resource pool for RRQ message transmission is bound with the resource pool for the RBC message transmission, a binding relationship is written into the RNUE and the UU, by using DeNB configuration, or presetting, or pre-configuration;

the SA resource pool and the PSSCH resource pool for RRP message transmission are respectively the same as the SA resource pool and the PSSCH resource pool for the RBC message transmission;

the locations of the physical resources bearing the RRQ message, which are indicated by the RNUE to the UU, are the resource pool for RRQ message transmission.

Preferably, the method further includes:

when the binding relationship is configured by the DeNB, determining, by the RNUE, configurations of the RRQ resource pool, which is bound with the resource pool for the RBC message transmission in the RNUE, based on the signaling transmitted by the DeNB.

Preferably, the RRQ resource pool, which is bound with the resource pool for the RBC message transmission in the RNUE, belongs to D2D broadcast communication Mode 2.

Preferably, destination ID domain in the SA of the RNUE, which is used for transmitting the RRP message, is the same as the UU ID in the RRQ message detected by the RNUE.

The present disclosure also provides a method for establishing a relay connection in a D2D broadcast communication-based relay network, including:

transmitting, by a UU, an RRQ message by using determined physical resources; and detecting, by the UU, an RRP message fed back by an RNUE in physical resources, which correspond to the physical resources transmitting the RRQ message.

Preferably, the physical resources are determined based on an indicator of the RNUE, or a standard definition, or a pre-configuration.

Preferably, the indicator of the RNUE is transmitted by using an RBC message, and transmitting by the UU the RRQ message by using the determined physical resources includes:

determining, by the UU, the physical resources for transmitting the RRQ message based on the RBC message; and, transmitting the RRQ message by using the determined physical resources, after generating relay requirements, or after detecting a paging message for the UU in the RBC message.

Preferably, the method further includes:

when the RBC message is transmitted by using a D2D broadcast communication mode, and the UU receives the RBC message respectively transmitted by multiple RNUEs, selecting, by the UU, an RNUE based on strength of a demodulation reference signal in a PSSCH, and/or, a SA in each detected RBC message, and determining the physical resources for transmitting the RRQ message, based on the RBC message transmitted by the RNUE selected.

Preferably, the method further includes:

when the RBC message is transmitted through a PSDCH in the manner of Type 2B, and the UU receives the RBC message respectively transmitted by multiple RNUEs, selecting, by the UU, an RNUE based on strength of a demodulation reference signal in the PSDCH of each detected RBC message, and determining the physical resources for transmitting the RRQ message based on the RBC message transmitted by the RNUE selected.

Preferably, a resource pool for RRQ message transmission is the same as a resource pool for RBC message transmission, and the resource pool for the RBC message transmission is determined by using a standard definition, or a pre-configuration.

Preferably, when the RBC message is transmitted through a PSDCH, a resource pool for RRQ message transmission is different from a resource pool for RBC message transmission, and the resource pool for the RRQ message transmission is determined by using a standard definition or a pre-configuration.

Preferably, the method further includes:

when the RBC message is transmitted by using a D2D broadcast communication mode, determining, by the UU, SA resources and PSSCH resources used for transmitting the RRQ message, based on a time-frequency resource indicator of the SA and the PSSCH in the RBC message; or, directly transmitting, by the UU, the PSSCH bearing the RRQ message, by using the time-frequency resource indicator and a modulation mode of the PSSCH in the RBC message.

Preferably, the method further includes:

when the RBC message is transmitted through a PSDCH in the manner of Type2B, determining, by the UU, PSDCH resources used for transmitting the RRQ message, based on a time-frequency resource indicator in the RBC message.

Preferably, when the RRQ message is located in a FDD carrier, transmission timing of the PSSCH bearing the RRQ message is (T+TA);

when the RRQ message is located in a TDD carrier, the transmission timing of the PSSCH bearing the RRQ message is (T+TA+624 Ts); T is a downlink timing of the UU, Ts is the minimum time granularity in a LTE system, TA is carried by the SA in the RBC message.

Preferably, a resource pool for RRQ message transmission is bound with a resource pool for RBC message transmission, and the resource pool for the RBC message transmission is determined by using a standard definition or a pre-configuration.

Preferably, the resource pool for the RBC message transmission belongs to D2D broadcast communication Mode 1, and the resource pool for the RRQ message transmission belongs to D2D broadcast communication Mode 2.

Preferably, a destination ID carried by the SA in the RRQ message is the same as a destination ID, which is carried by a corresponding RBC message.

The present disclosure also provides a UE in an IC scene, that is, an ICUE, which includes a triggering unit, a detecting unit and a triggering unit, wherein, the triggering unit is to detect whether the ICUE meets a set condition, and trigger the detecting unit and the transmitting unit to work, when detecting that the ICUE meets the set condition;

the detecting unit is to detect an RRQ message transmitted by a UU, after receiving trigger information from the triggering unit; and, for an RRQ message accepted by the ICUE, the transmitting unit is to transmit an RRP message to the UU, by using physical resources corresponding to physical resources bearing the RRQ message, after receiving the trigger information from the triggering unit.

The present disclosure also provides a UU, including a resource determining unit, a transmitting unit and a detecting unit, wherein, the resource determining unit is to determine corresponding physical resources, by using an indicator of an RNUE, or a standard definition, or a pre-configuration;

the transmitting unit is to transmit an RRQ message by using the physical resources, which are determined by the resource determining unit; and, the detecting unit is to detect an RRP message fed back by the RNUE in physical resources, which correspond to the physical resources determined by the resource determining unit.

In the technical solution provided by the present disclosure, based on indications of the DeNB, the RNUE may transmit a relay broadcast (RBC) message, and provide information necessary for the UU to select an RN. Furthermore, the RNUE may detect a relay request (RRQ) message coming from the UU in corresponding resources. For an accepted RRQ, the RNUE may confirm a relay connection with a corresponding UU, by using a relay response (RRP) message. Based on the received RBC message, the UU may determine transmission resources of the RRQ message based on a standard definition or a pre-configuration, and may establish a connection with the RNUE. By employing the method put forward by the present disclosure, relay connection between RNUE and UU may be established at the cost of a smaller changed standard.

BRIEF DESCRIPTION OF DRAWINGS

FIG. 1 is a flowchart illustrating a method implemented by an RNUE, in accordance with an embodiment of the present disclosure.

FIG. 2 is a flowchart illustrating a method implemented by a UU, in accordance with an embodiment of the present disclosure.

FIG. 3 is a flowchart illustrating implemented blocks in a first embodiment of the present disclosure.

FIG. 4 is a flowchart illustrating implemented blocks in a second embodiment of the present disclosure.

FIG. 5 is a flowchart illustrating implemented blocks in a third embodiment of the present disclosure.

FIG. 6 is a flowchart illustrating implemented blocks in a fourth embodiment of the present disclosure.

MODE FOR THE INVENTION

To make objectives, technical solutions and advantages of the present disclosure more clear, the present disclosure is further described in detail in the following, accompanying with attached figures and embodiments.

The UE or UU may include a communication unit (transceiver) and a control unit (controller). The communication unit may communicate with a different network node (ENB, UE or UU). The control unit controls overall states and operations of the components of the UE or UU. This is for ease of description only. That is, the above apparatus may have a different configuration. For example, the UE or UU may further include an input unit and a storage unit.

In a D2D broadcast communication-based relay system, an RN node, which executes forwarding functions between DeNB and UU, is an ICUE supporting relay functions. The present disclosure provides a method for establishing a relay connection, which may include processes of ICUE and UU. For an ICUE supporting the relay functions, as shown in FIG. 1, the following blocks may be included.

In block 110, after meeting a set condition, an ICUE supporting the relay functions may detect an RRQ message coming from a UU in corresponding physical resources.

After receiving a relay configuration signaling indicator from a DeNB, the ICUE may execute foregoing operations. That is, the set condition, which needs to be satisfied, is to receive the relay configuration signaling indicator from the DeNB. The DeNB may determine whether to transmit relay configure signaling to the ICUE, based on measurement report of the ICUE. The measurement report of the ICUE may at least reflect the following events. Signal strength of the strongest RNUE within a cell, which is received by a UE, is less than a certain threshold (T-RN). Based on an implementation method of the present disclosure, when DeNB signal strength received by the ICUE is less than a certain threshold (T-DeNB), the ICUE may automatically measure signal strengths of other RNUEs within the cell. Based on another implementation method of the present disclosure, after receiving specific indication signaling from the DeNB indicating to measure or detect, the UE may start to measure signal strengths of other RNUEs within the cell. The indication signaling of the DeNB may additionally include measurement auxiliary information, e.g., SA time-frequency resource index, which is employed by an RNUE in the cell when transmitting a signal with the D2D broadcast communication mode. Based on still another implementation method of the present disclosure, a UE supporting the relay functions may determine whether to execute foregoing operations, based on current state, e.g., a reference signal receiving power (RSRP) received from the DeNB is less than a certain threshold, or a signal is received from the UU.

Based on the foregoing contents, it can be seen that in the present disclosure, when receiving a measurement report from the RNUE, and the measurement report indicates that signal strength of the strongest RNUE within the cell received by the RNUE is less than a set first threshold T-RN, the DeNB may transmit a relay configuration signaling indicator to the RNUE transmitting the measurement report. Before transmitting the measurement report, the RNUE transmitting the measurement report may start to measure signal strength of each current RNUE within the cell, after determining that the received signal strength of the DeNB is less than a set second threshold T-DeNB. Alternatively, before transmitting the measurement report, the RNUE transmitting the measurement report may start to measure signal strength of each current RNUE within the cell, after receiving measure indication signaling from the DeNB. More particularly, the measure indication signaling transmitted by the DeNB may further include measurement auxiliary information.

The foregoing ICUE may determine parameters, such as T-DeNB and T-RN, by using signaling received from the DeNB, or pre-configuration, or standard definition. An ICUE meeting the set condition may be referred to as RNUE in the following.

Physical resources located by the RRQ message may be indicated by the RNUE. In this case, before block 110, the RNUE needs to transmit an RBC message, so as to inform the UU of foregoing physical resource configuration. Alternatively, the foregoing physical resources may be directly defined by the standard, or be determined by a pre-configured mode.

In the foregoing processes, take the relay configuration signaling indicator received from the DeNB as the set condition needing to be satisfied. However, in practical applications, other conditions may also be set based on requirements. When meeting a corresponding condition, a corresponding ICUE supporting the relay functions may be taken as an RNUE, to start executing the flow.

In block 120, the RNUE may feed back an RRP message to the foregoing UU by using physical resources, which correspond to the physical resources located by the RRQ message.

For the UU, as shown in FIG. 2, the following blocks may be included.

In block 210, a UU may transmit an RRQ message by using specific physical resources.

Based on an implementation method of the present disclosure, the UE may obtain physical resource configuration of the RRQ message by receiving the RBC message, or by using standard definition or pre-configuration.

In block 220, the UU may detect an RRP message fed back by an RNUE by using physical resources, which correspond to the physical resources transmitting the RRQ message.

To facilitate understanding of the present disclosure, the foregoing technical solutions of the present disclosure will be further described in detail as follows, accompanying with specific application conditions and interactive mode among devices.

A First Embodiment

In the embodiment, the RNUE may be indicated by configure signaling of the DeNB, or may be determined by a UE. The RNUE may broadcast RRQ physical resource configuration information by using the RBC. The resource pool for the RRQ message transmission is the same as the resource pool for the RBC message transmission. The RNUE may further detect the RRQ from the UU in the foregoing physical resources, and further feed back the RRP for the accepted RRQ by using corresponding RRP physical resources. The UU may obtain RRQ resource configuration information by receiving RBC signaling. After the UU generates relay requirements, or after detecting paging message for the UU in the RBC, transmit the RRQ in the foregoing physical resources, and further detect the RRP in the corresponding RRP physical resources. As shown in FIG. 3, the specific implementation blocks may be as follows.

FIG. 3 is a flowchart illustrating implemented blocks in a first embodiment of the present disclosure.

In block 310, an RNUE may transmit an RBC message by using corresponding physical resources.

In the embodiment, the RBC message may be transmitted by using the D2D broadcast communication mode, which is defined by Rel-12. The D2D broadcast communication resource pool (which may be referred to as RBC resource pool in the following) transmitting the RBC message belongs to Mode 1, which is defined by Rel-12. The RNUE may receive signaling from DeNB, and obtain time-frequency resources in the RBC resource pool used for the RBC message transmission. The time-frequency resources may include time-frequency resources used for transmitting the SA and physical sidelink shard channel (PSSCH). That is, the RBC resource pool may include an SA resource pool and a PSSCH resource pool.

In addition, when the RNUE transmits an RBC message within a period of current RBC resource pool, the RNUE may transmit a primary sidelink synchronization signal (PSSS), a secondary sidelink synchronization signal (SSSS), and a physical sidelink broadcast channel (PSBCH) on all the synchronization resources within the period of the RBC resource pool.

The RBC message may include at least one of the following information:
1. a public land mobile network (PLMN) identity (ID) of current cell;
2. a closed subscriber group (CSG) ID of current cell;
3. a destination ID ($n_{ID}^{SA}$, which is used for PSSCH scrambling of RRQ message);
4. time-frequency resource indicator (at least includes time-frequency resources of the PSSCH) when transmitting the RRQ message;
5. paging message for at least one UU;
6. signaling between another DeNB except for the DeNB and a UU in a transparent transmission system.

The RNUE may obtain the value of destination ID, by using received DeNB signaling or pre-configuration. The destination ID may be unique within a range of all the RNUEs in the cell. When the RBC message includes the time-frequency resource indicator for transmitting the RRQ message, the time-frequency resources may be allocated by the DeNB. The RNUE may determine the time-frequency resource indicator by receiving the eNB signaling. That is, the time-frequency resource indicator for transmitting the RRQ message may be allocated by the DeNB, and is indicated to the RNUE. The paging message may be transmitted transparently. In other words, the RNUE will not decode (refer to ASN.1 decode) the paging message received from the DeNB, and may forward the paging message to the UU. Alternatively, the RNUE may decode the paging message, and then re-encode the message, based on an encoding mode between the RNUE and the UU. Subsequently, the RNUE may transmit the re-encoded paging message to the UU.

In block 320, the UU may determine RRQ physical resource configuration, and transmit the RRQ message by using corresponding resources.

Since the UU may receive the RBC message respectively from multiple RNUEs, the UU may select an RNUE, based on strength of demodulation reference signal in the PSSCH, and/or, SA of the detected RBC message.

In the embodiment, the SA resource pool and PSSCH resource pool, which are used for the RRQ message transmission, are respectively the same as the SA resource pool and the PSSCH resource pool, which are used for the RBC message transmission. Thus, the physical resource configuration used for transmitting the RRQ message may include RRQ resource pool configuration, the SA time-frequency resources used for transmitting the RRQ, and the PSSCH time-frequency resources used for transmitting the RRQ. The RRQ resource pool may include the SA resource pool for the RRQ message transmission, and the PSSCH resource pool for the RRQ message transmission. The UU may determine the RBC resource pool configuration, by using the standard definition or pre-configuration, so as to detect the RBC message. And then, the UU may determine configurations of the SA resource pool and the PSSCH resource pool for the RRQ message transmission, based on the RBC resource pool configuration in the detected RBC message. That is, in block 310, the RBC resource pool configured by the DeNB should be one of standard-defined or pre-configured RRQ resource pools. The RBC resource pool and RRQ resource pool are referred to as control resource pool hereinafter.

Based on an implementation method of the present disclosure, the UU may obtain time-frequency resource indicators of SA and PSSCH, which are used for transmitting the RRQ, based on indicators of the RBC message. In this case, in block 310, the RBC message should include time-frequency resource indicator for transmitting the RRQ message. The resource indicator may include resources of SA and PSSCH. Based on another implementation method of the present disclosure, the UU may obtain the PSSCH time-frequency resource indicator for transmitting the RRQ message, and PSSCH modulation mode, based on indicator of the RBC message. The UU may directly transmit the PSSCH of the RRQ, based on the foregoing information.

In addition, when current RRQ transmission is located in a frequency division duplexing (FDD) carrier, transmission timing of the PSSCH including the RRQ message may be (T+TA). When current RRQ transmission is located in a time division duplexing (TDD) carrier, the transmission timing of the PSSCH including the RRQ message may be (T+TA+624 Ts). T is the downlink timing of the UU, that is, the timing determined by received PSSS/SSSS. Value of TA is the same as the value of TA carried by the SA in the corresponding RBC message. Ts is the minimum time granularity in the LTE system. 30720 Ts=1 ms.

Destination ID carried by the SA in the RRQ message is the same as the destination ID, which is carried by a corresponding RBC message. The same ID is used for PSSCH scrambling of the RRQ.

The RRQ message should at least include one UU ID, which may identify the UU. The UU ID may possess 8 bits, e.g., a random number of 8 bits, or a certain pre-configured ID of 8 bits. In addition, the RRQ message may further include other information used for authentication. The RRQ message may further carry current buffer information of the UU. The buffer information may reflect data amount, which needs to be forwarded by the UU to the eNB through the RNUE.

In block 330, the RNUE may detect the RRQ message in the RRQ physical resources, and feed back the RRP message by using corresponding resources.

In the embodiment, the SA resource pool and the PSSCH resource pool for the RRP message transmission are respectively the same as the SA resource pool and the PSSCH resource pool for the RBC message transmission.

Destination ID domain in the SA used for transmitting the RRP is the same as UU ID, which is in the RRQ message detected by the RNUE. The ID is used for PSSCH scrambling, when transmitting the RRP.

Before transmitting the RRP, the RNUE may apply to the DeNB for resources, which are used for transmitting uplink data. The RNUE may also enable the RRP to carry time-frequency resource indicator used for transmitting uplink data. Based on an implementation method of the present disclosure, the resource indicator may include uplink SA resource and uplink PSSCH resource. Based on another implementation method of the present disclosure, the resource indicator may only include time-frequency resource indicator of uplink PSSCH. In this case, the RRP may further include modulation mode of uplink PSSCH. The UU may directly transmit the uplink PSSCH based on the foregoing information.

Until now, the flow may be terminated. Based on the method provided by the embodiment, RBC, RRQ and RRP messages are transmitted through a same resource pool, which may facilitate to reduce wireless resources occupied by the D2D. Meanwhile, since format of foregoing resource pool is Mode 1, physical resources transmitting each message may be allocated by the eNB. Subsequently, collision among messages transmitted by different UEs may be avoided, and success rate for establishing relay connections may be improved.

A Second Embodiment

In the embodiment, an RNUE may be indicated by configure signaling of a DeNB, or may be determined by a UE. The RNUE may transmit an RBC message in a corresponding resource pool. In the embodiment, the resource pool for the RBC message transmission is different from the resource pool for the RRQ message transmission. However, a binding relationship may exist therebetween. The binding relationship may be written into the UE (including the RNUE and UU), by using DeNB configuration, or standard definition, or pre-configuration. The RNUE may further detect an RRQ coming from the UU in the RRQ resource pool, and further feed back an RRP for the accepted RRQ by using corresponding RRP physical resources. The UU may receive RBC signaling, and determine transmission resources of the RRQ. After the UU generates relay requirements, or after detecting a paging message for the UU in the RBC, transmit the RRQ by using the foregoing physical resources, and further detect the RRP in corresponding RRP physical resources. The specific implementation blocks may be as follows.

FIG. 4 is a flowchart illustrating implemented blocks in a second embodiment of the present disclosure.

In block 410, an RNUE may transmit an RBC message by using corresponding physical resources.

In the embodiment, the RBC message may be transmitted by using the D2D broadcast communication mode, which is defined by Rel-12. The D2D broadcast communication resource pool (which may be referred to as RBC resource pool in the following) transmitting the RBC message may belong to Mode 1, which is defined by Rel-12. The RNUE may receive signaling from the DeNB, and obtain time-frequency resources in the RBC resource pool for the RBC message transmission. The time-frequency resources may include time-frequency resources used for transmitting the SA and the PSSCH. That is, the RBC resource pool may include an SA resource pool and a PSSCH resource pool.

When the correlation between the RBC resource pool and the RRQ resource pool is configured by the DeNB, the RNUE should receive the DeNB signaling, and determine configurations of the RRQ resource pool, which is correlated with current RBC resource pool. The RRQ resource pool may belong to Mode 2 defined by Rel-12. The RRQ resource pool may include an SA resource pool and a PSSCH resource pool, both of which are used for transmitting the RRQ.

In addition, when the RNUE transmits the RBC message within a period of current RBC resource pool, the RNUE should transmit the PSSS, SSSS and PSBCH on all the synchronization resources, which are within the period of the RBC resource pool.

The RBC message should include at least one of the following information.
 1. configurations of the RRQ resource pool;
 2. PLMN ID of current cell;
 3. CSG ID of current cell;
 4. destination ID ($n_{ID}^{SA}$, which is used for PSSCH scrambling of the RRQ message);
 5. paging message for at least one UU;
 6. signaling between another DeNB except for the DeNB and UU in a transparent transmission system.

When the binding relationship between the RBC resource pool and the RRQ resource pool is configured by the DeNB, the RBC message should include configurations of the RRQ resource pool. The RNUE may obtain value of the destination ID, by using signaling received from the DeNB, or by using pre-configuration. The destination ID may be unique within a range of all the RNUEs in the cell. The paging message may be transmitted transparently. That is, the RNUE may not decode (refer to ASN.1 decode) the paging message coming from the DeNB. Instead, the RNUE may just forward the paging message to the UU. Alternatively, the RNUE may decode the paging message, re-encode the paging message based on an encoding mode between the RNUE and the UU, and then transmit the re-encoded paging message to the UU.

In block 420, a UU may determine configurations of the RRQ physical resources, and transmit an RRQ message by using the foregoing resources.

Since the UU probably receives an RBC message respectively from multiple RNUEs, the UU may select an RNUE, based on strength of demodulation reference signal of the PSSCH, and/or, SA in the detected RBC message.

The UU may determine configurations of the SA resource pool and the PSSCH resource pool for the RBC message transmission, based on standard definition or pre-configuration. That is, the RBC resource pool configured by the DeNB in block 310 should be one of standard-defined or pre-configured RRQ resource pool. In addition, the UU may determine the RRQ resource pool bound with the RBC resource pool, by using received RBC message, or standard definition, or pre-configuration. The RRQ resource pool should belong to Mode 2 defined by Rel-12.

The UU may determine time-frequency resources of SA and PSSCH, which are used for transmitting the RRQ, and determine transmission mode about time-frequency resources of SA and PSSCH, based on a mechanism defined by Rel-12.

The destination ID carried by the SA in the RRQ message is the same as the destination ID, which is carried by a corresponding RBC message. The same ID is used for PSSCH scrambling of the RRQ.

The RRQ message should include at least one UU ID used for identifying the UU. The UU ID may be 8 bits, e.g., a random number of 8 bits, or a certain pre-configured ID of 8 bits. In addition, the RRQ message should further include other information used for authentication.

In block 430, the RNUE may detect the RRQ message in the physical resources of the RRQ, and feed back an RRP message by using corresponding resources.

In the embodiment, the SA resource pool and the PSSCH resource pool for the RRP message transmission are respectively the same as the SA resource pool and the PSSCH resource pool for the RBC message transmission.

The destination ID domain in the SA transmitting the RRP is the same as the UU ID, which is in the RRQ message detected by the RNUE. The ID is used for PSSCH scrambling, when transmitting the RRP.

Until now, the flow may be terminated. By using the method provided by the embodiment, the RRQ may be transmitted by a resource pool different from the RBC resource pool, so as to more flexibly allocate the physical resources of the D2D.

A Third Embodiment

In the embodiment, the RNUE may be determined by configuration signaling indicator of the DeNB, or may be determined by the UE. The RNUE may transmit an RBC message in a corresponding resource pool. In the embodiment, the RBC message only includes configurations of a paging message transmission window. The RNUE may transmit a paging message for a certain UU, or for multiple UUs, within an SA period of the paging message transmission window. In the embodiment, the RRQ resource pool may also be determined, by using the method in the first or second embodiment. The RNUE may detect the RRQ coming from the UU in the RRQ resource pool, and further feed back an RRP for the accepted RRQ by using corresponding RRP physical resources. The UU may receive the RBC signaling, determine configurations of the paging message transmission window, and determine transmission resources of the RRQ based on the method in the first or second embodiment. The UU should detect a paging message within the paging message transmission window. After the UU generates relay requirements, or after detecting the paging message for the UU in the RBC, transmit the RRQ by using the physical resources, and further detect the RRP in the corresponding RRP physical resources. The specific implementation blocks may be as follows.

FIG. 5 is a flowchart illustrating implemented blocks in a third embodiment of the present disclosure.

In block 510, an RNUE may transmit an RBC message by using corresponding physical resources.

In the embodiment, the RBC message may be transmitted by using the D2D broadcast communication mode, which is defined by Rel-12. The D2D broadcast communication resource pool (referred to as RBC resource pool in the following), which transmits the RBC message, may belong to Mode 1 defined by Rel-12. The RNUE may receive signaling from the DeNB, and obtain time-frequency resources for transmitting the RBC in the RBC resource pool. The time-frequency resources may include time-frequency resources used for transmitting the SA and the PSSCH. That is, the RBC resource pool may include an SA resource pool and a PSSCH resource pool.

In addition, when the RNUE transmits the RBC message within a period of current RBC resource pool, the RNUE should transmit the PSSS, SSSS and the PSBCH on all the synchronization resources within the period of the RBC resource pool.

The RBC message should include at least one of the following information.
1. configurations of paging message transmission window;
2. paging message (when the RBC message is transmitted within the paging message transmission window);
3. configurations of RRQ resource pool;
4. PLMN ID of current cell;
5. CSG ID of current cell;
6. destination ID ($n_{ID}^{SA}$, which is used for PSSCH scrambling of the RRQ message);
7. paging message for at least one UU;
8. signaling between another DeNB except for the DeNB and UU in a transparent transmission system.

Configurations of the paging message transmission window may at least include transmission period and offset of the paging message. Transmission period unit of the paging message may be the SA period for transmitting the RBC. Time duration of the paging message transmission window may be the same as SA period duration for transmitting the RBC. Offset of the paging message transmission window may denote starting point of a first paging window, which is within a system frame period. Offset unit of the paging message transmission window is the SA period of the SA, when transmitting the RBC. Starting point of subframes in the paging window may satisfy the following condition: (SFN*10+n) mod N*SL-PeriodComm=SL-OffsetIndicator+ Δ*SL-PeriodComm. SFN and n are respectively system frame number and subframe number, which correspond to the starting point of subframes in the paging window. N and Δ are respectively paging message transmission period, and offset of the paging message transmission window. SL-PeriodComm and SL-OffsetIndicator are respectively the SA period and the offset, when transmitting the RBC.

The RNUE may obtain value of destination ID, by using signaling received from the DeNB, or by using pre-configuration. The destination ID may be unique in a range of all the RNUEs in a cell. When current RBC transmission period is the paging message transmission window, the RBC message should include the paging message. The paging message may be transmitted transparently. That is, the RNUE may not decode (refer to ASN.1 decode) the paging message received from the DeNB. Instead, the RNUE may just forward the paging message to the UU. Alternatively, the RNUE may decode the paging message, and re-encode the paging message based on an encoding mode between the RNUE and the UU, and then transmit the re-encoded paging message to the UU.

In block 520, a UU may determine configurations of RRQ physical resources, and transmit an RRQ message by using the resources.

In the embodiment, operations in block 420 or block 520 may be reused in the block.

In block 530, the RNUE may detect the RRQ message in the RRQ physical resources, and feed back an RRP message by using corresponding resources.

In the embodiment, the SA resource pool and the PSSCH resource pool for the RRP message transmission are respectively the same as the SA resource pool and the PSSCH resource pool for the RBC message transmission.

Destination ID domain in the SA for transmitting the RRP is the same as UU ID, which is in the RRQ message detected by the RNUE. The ID is used for PSSCH scrambling, when transmitting the RRP.

Until now, the embodiment may be terminated. By employing the method provided by the embodiment, period of paging message may be configured independently, which may facilitate to reduce frequency used by the UU when detecting the paging message, and reduce power loss of the UU.

A Fourth Embodiment

In the embodiment, the RNUE may be determined by configuration signaling indicator of a DeNB, or may be determined by a UE. The RNUE may transmit an RBC message in a corresponding resource pool, and further detect an RRQ coming from the UU in the foregoing physical resources. The RRQ resource pool may be the same as, or may be different from the resource pool for the RBC message transmission. The RNUE may further feed back an RRP for the accepted RRQ by using corresponding RRP physical resources. The UU may obtain RRQ resource configuration information, by using received RBC signaling, or standard definition, or pre-configuration. After the UU generates relay requirements, or after detecting a paging message for the UU in the RBC, transmit the RRQ by using the physical resources, and further detect the RRP in the corresponding RRP physical resources. Specific implementation blocks may be as follows.

FIG. 6 is a flowchart illustrating implemented blocks in a fourth embodiment of the present disclosure.

In block 610, an RNUE transmits an RBC message by using corresponding physical resources.

In the embodiment, the RBC message may be transmitted by a physical sidelink discovery channel (PSDCH) defined by Rel-12. Transmission mode of the RBC message may belong to Type 1 defined by Rel-12. In this case, the RBC message should be transmitted for at least three times. Alternatively, transmission mode of the RBC message may belong to Type 2B defined by Rel-12. In this case, the RBC message should be transmitted for at least three times. The RNUE may receive signaling from the DeNB, and obtain time-frequency resources used for transmitting the RBC from the RBC resources pool. The RBC resource pool here refers to the PSDCH resource pool for the RBC message transmission.

In addition, when the RNUE transmits the RBC message within a period of current RBC resource pool, the RNUE should transmit a PSSS, an SSSS and a PSBCH on all the synchronization resources within the period of the RBC resource pool.

The RBC message should include at least one of the following information.
1. PLMN ID of current cell;
2. CSG ID of current cell;
3. destination ID ($n_{ID}^{SA}$, which is used for PSSCH scrambling of the RRQ message);
4. time-frequency resource indicator (at least includes time-frequency resources of the PSSCH) for transmitting the RRQ message;
5. paging message for a certain UU, or multiple UUs;
6. signaling between another DeNB and the UU, which is transmitted transparently.

When the RBC message is transmitted in the manner of Type 2B, and the RBC message includes time-frequency resource indicator for transmitting the RRQ message, the time-frequency resources may be allocated by the DeNB. The RNUE may determine the time-frequency resource indicator by receiving signaling from an eNB. The paging message may be transmitted transparently. That is, the RNUE does not decode (refer to ASN.1 decode) the paging message received from the DeNB, and just forwards the paging message to the UU. Alternatively, the RNUE may decode the paging message, re-encode the paging message based on an encoding mode between the RNUE and the UU, and then transmit the re-encoded paging message to the UU.

In block 620, a UU may determine configurations of RRQ physical resources, and transmit an RRQ message by using corresponding resources.

Since the UU probably receives the RBC message respectively from multiple RNUEs, the UU may select an RNUE, based on strength of demodulation reference signal in the PSDCH of the detected RBC message.

In the embodiment, the resource pool for the RRQ message transmission may be the same as the resource pool for the RBC message transmission. The UU may determine configurations of the RBC resource pool, by using the standard definition or pre-configuration, so as to detect the RBC message. And then, the UU may determine configurations of the resource pool for the RRQ message transmission, based on configurations of the RBC resource pool in the detected RBC message. That is, the RBC resource pool configured by the DeNB in block 610 should be one of the standard-defined or pre-configured RRQ resource pools. The RBC resource pool and RRQ resource pool are referred to as control resource pool in the following. In addition, the resource pool for the RRQ message transmission may be different from the resource pool for the RBC message transmission. In this case, the UU may determine configurations of the RRQ resource pool, by using the standard definition or pre-configuration.

Based on another implementation method of the present disclosure, when the RBC is transmitted in the manner of Type 2B, the UU may obtain time-frequency resource indicator used for transmitting the RRQ, by using indicator of the RBC message. In this case, in block 610, the RBC message should include time-frequency resource indicator used for transmitting the RRQ message.

In addition, when current RRQ transmission is located within an FDD carrier, transmission timing of the PSSCH including the RRQ message may be (T+TA). When current RRQ transmission is located within a TDD carrier, transmission timing of the PSSCH including the RRQ message may be (T+TA+624 Ts). T is downlink timing of the UU, that is, the timing determined by received PSSS/SSSS. Value of TA may be the same as value of TA carried by SA in the corresponding RBC message. Ts is the minimum time granularity in the LTE system, 30720 Ts=1 ms.

The RRQ message should include at least one UU ID, which may identify the UU. The UU ID may include 8 bits, e.g., a random number of 8 bits, or a certain pre-configured ID of 8 bits. In addition, the RRQ message should further include other information used for authentication. The RRQ message should further carry current buffer information of the UU. The buffer information may reflect data amount, which is needed to be forwarded by the UU to the eNB through the RNUE.

In block 630, the RNUE may detect the RRQ message in the RRQ physical resources, and feed back an RRP message by using corresponding resources.

In the embodiment, the resource pool for the RRP message transmission may be the same as the resource pool for the RBC message transmission. Transmission mode of the RRP may be the same as that of the RBC.

Before transmitting the RRP, the RNUE may apply to the DeNB for resources used for transmitting uplink data, and enable the RRP to carry time-frequency resource indicator used for transmitting uplink data. Based on an implementation method of the present disclosure, the resource indicator may include resources of uplink SA and uplink PSSCH. Based on another implementation method of the present disclosure, the resource indicator may only include time-frequency resource indicator of uplink PSSCH. In this case, the RRP should further include modulation mode of uplink PSSCH. The UU may directly transmit the uplink PSSCH based on forgoing information.

Until now, the embodiment may be terminated. By using the method provided by the embodiment, the RBC, RRQ and RRP may be transmitted through the PSDCH. Existing mutual discovery mechanism may be reused, so as to reduce implementation complexity.

The foregoing is specific implementation about a method for establishing relay in the present disclosure. The present disclosure also provides an ICUE and a UU, which may implement the foregoing method for establishing relay. Specifically speaking, the ICUE provided by the present disclosure may include a triggering unit, a detecting unit and a transmitting unit.

The triggering unit is to detect whether the ICUE meets a set condition. When meeting the set condition, the triggering unit may trigger the detecting unit and transmitting unit to work. After receiving trigger information from the triggering unit, the detecting unit may detect the RRQ message transmitted by the UU. After receiving the trigger information from the triggering unit, the transmitting unit may transmit an RRP message for the RRQ message accepted by the ICUE to the UU, by using physical resources corresponding to physical resources bearing the RRQ message.

The set condition detected by the triggering unit may be as follows. Receive a relay configuration signaling indicator from the DeNB. Furthermore, trigger condition for the DeNB to transmit the relay configuration signaling indicator to the RNUE may be as follows. The DeNB receives a measurement report from the RNUE, and the corresponding measurement report indicates that the signal strength of the strongest RNUE within the cell, which is received by the RNUE, is less than a set first threshold T-RN. At this time, the DeNB may transmit the relay configuration signaling indicator to the RNUE, which transmits the measurement report. The RNUE may further include a signal strength detecting unit, which may start to measure signal strength of each current RNUE within the cell, when determining that strength of the received DeNB signal is less than a set second threshold T-DeNB. Alternatively, the signal strength detecting unit may start to measure signal strength of each current RNUE within the cell, after receiving measurement indicator signaling from the DeNB.

Furthermore, when detecting the RRQ message, modes for the detecting unit to determine locations of physical resources bearing the RRQ message may include as follows. The RNUE may indicate to the UU locations of the physical resources bearing the RRQ message, or pre-specified or pre-configured locations of the physical resources bearing the RRQ message. A broadcast unit may be added to the RNUE. The broadcast unit may indicate to the UU locations of physical resources bearing the RRQ message, by using the RBC message. Here, the RBC message may be transmitted in the manner of D2D broadcast communication. The D2D broadcast communication resource pool for the RBC message transmission may belong to D2D broadcast communication Mode 1. The broadcast unit in the RNUE may determine time-frequency resources for the RBC message transmission in the RBC resource pool, based on signaling transmitted by the DeNB. The RBC resource pool may include the SA resource pool and the PSSCH resource pool. After the broadcast unit transmits the RBC message within a resource pool period, the transmitting unit may further transmit signals of PSSS, SSSS and PSBCH on all the synchronization resources, which are within the same resource pool period.

Relationship between the resource pool for the RRQ message transmission and the RBC resource pool may be as follows. The resource pool used by the UU for the RRQ message transmission may be the same as the resource pool, which is used by the broadcast unit in the RNUE for the RBC message transmission. The SA resource pool and the PSSCH resource pool, which are used by the transmitting unit in the RNUE for the RRP message transmission, are respectively the same as the SA resource pool and the PSSCH resource pool, which are used by the broadcast unit for the RBC message transmission. An indicating unit added to the RNUE may indicate the following contents to the UU. Locations of the physical resources bearing the RRQ message are the time-frequency resource indicator for transmitting the RRQ message. Here, the RBC message may include at least one of PLMN ID of current cell, CSG ID of current cell, destination ID for implementing scrambling of the RRQ message, time-frequency resource indicator for transmitting the RRQ message, paging message for at least one UU, signaling between another DeNB except for the DeNB and the UU in a system. In the foregoing information carried by the RBC message, the RNUE may obtain the destination ID by receiving signaling from the DeNB, and/or, the time-frequency resource indicator is allocated by the DeNB and indicated to the RNUE.

Furthermore, before the transmitting unit in the RNUE transmits the RRP message, the RNUE may apply to the DeNB for resources used for transmitting uplink data, and enable the RRP message to carry the time-frequency resource indicator, which is used for transmitting uplink data and issued by the DeNB. The time-frequency resource indicator used for transmitting uplink data may include resources of uplink SA and uplink PSSCH. Alternatively, the time-frequency resource indicator used for transmitting uplink data may include resources of uplink PSSCH. And, the RRP message may further include modulation mode of uplink PSSCH.

Relationship between the resource pool for the RRQ message transmission and the RBC resources pool may be as follows. The resource pool used by the UU for the RRQ message transmission may be bound with the resource pool, which is used by the broadcast unit in the RNUE for the RBC message transmission. The binding relationship may be written into the RNUE and the UU, by using DeNB configuration, or presetting, or pre-configuration. The SA resource pool and PSSCH resource pool, which are used by the transmitting unit in the RNUE for the RRP message transmission, are respectively the same as the SA resource pool and the PSSCH resource pool, which are used by the broadcast unit for the RBC message transmission. Here, the indicating unit added to the RNUE may indicate the following contents to the UU. Locations of physical resources bearing the RRQ message are the resource pool for the RRQ message transmission.

In addition, when foregoing binding relationship is configured by the DeNB, the RNUE may determine configurations of the RRQ resource pool, which is bound with the resource pool for the RBC message transmission thereof, based on signaling transmitted by the DeNB. The RRQ resource pool, which is bound with the resource pool employed by the broadcast unit of the RNUE for the RBC message transmission, may belong to D2D broadcast communication Mode 2. In the mode, the RBC message may at least include configurations of RRQ resource pool, PLMN ID of current cell, CSG ID of current cell, destination ID for implementing scrambling of the RRQ message, paging message for at least one UU, signaling between another DeNB except for the DeNB and the UU in a system. Furthermore, in the foregoing information included by the RBC message, the RNUE may obtain the destination ID by receiving signaling from the DeNB, and/or, when the binding relationship is configured by the DeNB, the RBC message transmitted by the broadcast unit may include configurations of the RRQ resource pool. Destination ID domain in the SA of the RRP message transmitted by the transmitting unit of the RNUE may be the same as the UU ID, which is in the RRQ message detected by the detecting unit in the RNUE.

Alternatively, the RBC message may further include at least one of configurations of paging message transmission window, paging message, configurations of RRQ resource pool, PLMN ID of current cell, CSG ID of current cell, destination ID used for implementing scrambling of the RRQ message, paging message for at least one UU, signaling between another DeNB except for the DeNB and the UU. Configurations of the paging message transmission window may include transmission period and offset of the paging message. Unit of paging message transmission period may be the SA period for transmitting the RBC message. Time duration of the paging message transmission window may be the same as SA period duration for transmitting the RBC message, and/or, offset unit of the paging message transmission window may be the SA period for transmitting the RBC message.

Starting point of subframes in the paging message transmission window may satisfy the following conditions. (SFN*10+n) mod N*SL-PeriodComm=SL-OffsetIndicator+ Δ*SL-PeriodComm. SFN and n are respectively a system frame number and a subframe number, which correspond to the starting point of subframes in the paging message transmission window. N and Δ may respectively denote the paging message transmission period and offset of the paging message transmission window. SL-PeriodComm and SL-OffsetIndicator may respectively denote the SA period and offset, when transmitting the RBC message.

The UU provided by the present disclosure may include a resource determining unit, a transmitting unit and a detecting unit.

The resource determining unit may determine corresponding physical resources, by using indicator of the RNUE, or standard definition, or pre-configuration. The transmitting unit may transmit an RRQ message, by using the determined physical resources. The detecting unit may detect the RRQ message fed back by the RNUE in physical resources, which correspond to the physical resources determined by the resource determining unit.

The resource determining unit may determine the physical resources, by using indicator of the RNUE, or standard definition, or pre-configuration. Here, the indicator of the RNUE may be transmitted by using the RBC message. The transmitting unit of the UU may determine physical resources used for transmitting the RRQ message, based on the RBC message. After the UU generates relay requirements, or after detecting the paging message for the UU in the RBC message, transmit the RRQ message by using the determined physical resources.

When receiving the RBC message respectively from multiple RNUEs, the resource determining unit of the UU may select an RNUE, based on strength of demodulation reference signal in the SA and PSSCH of each detected RBC message, and may further determine the physical resources transmitting the RRQ message, based on the RBC message transmitted by the RNUE selected.

The resource pool for the RRQ message transmission may be the same as the resource pool for the RBC message transmission. The RBC resource pool may be determined by using the standard definition or pre-configuration. Here, the resource determining unit of the UU may determine the SA and PSSCH resources, which are used for transmitting the RRQ message, based on the time-frequency resource indicator of the SA and PSSCH in the RBC message. Alternatively, the transmitting unit of the UU may directly transmit the PSSCH bearing the RRQ message, based on the time-frequency resource indicator and modulation mode of the PSSCH in the RBC message When the RRQ message is located in an FDD carrier, transmission timing of the PSSCH bearing the RRQ message may be (T+TA). When the RRQ message is located in a TDD carrier, transmission timing of the PSSCH bearing the RRQ message may be (T+TA+624 Ts). T is the downlink timing of the UU. Ts is the minimum time granularity in the LTE system. TA is carried by the SA in the RBC message.

The resource pool for the RRQ message transmission may be bound with the resource pool for the RBC message transmission. The resource pool for the RBC message transmission may be determined by using standard definition, or pre-configuration. The resource pool for the RBC message transmission may belong to D2D broadcast communication Mode 1. The resource pool used by the transmitting unit for the RRQ message transmission may belong to D2D broadcast communication Mode 2. The destination ID carried by the SA in the RRQ message may be the same as the destination ID, which is carried by the corresponding RBC message. The RRQ message may further include ID information used for identifying the UU. The RRQ message may further include information used for authentication, and/or, data amount needing to be forwarded to the DeNB through the RNUE.

Persons having ordinary skill in the art may understand that, all the blocks or some blocks in the method provided by foregoing embodiment may be implemented by related hardware, which is instructed by a program. The program may be stored in a computer readable storage medium. When executing the program, one block of combination of blocks in the method embodiment may be included.

In addition, each functional unit in embodiments of the present disclosure may be integrated into one processing module. Alternatively, each unit may be independent physical entity. Still alternatively, at least two units may be integrated into one module. Foregoing integrated module may be implemented by hardware, or may be implemented by software functional module. When being implemented by software functional module, and is sold or used as an independent product, the integrated module may be stored in a computer readable storage medium.

The foregoing storage medium may be read only memory (ROM), disk, or compact disc (CD).

The foregoing is only preferred embodiments of the present disclosure, which is not used for limiting the present disclosure. Any modifications, equivalent substitutions and improvements made within the spirit and principle of the present disclosure, should be covered by the protection scope of the present disclosure.

The invention claimed is:

1. A method for establishing a relay connection by a relay node user equipment (RNUE) supporting relay functions in a device to device (D2D) broadcast communication-based relay network, comprising:
   transmitting, by the RNUE, which is in an in coverage (IC) scene of a Donor evolved Node B (DeNB), a relay broadcast (RBC) message on a first physical resource from a resource pool, the RBC message including information indicating a second physical resource for a relay request (RRQ) message from the resource pool;
   receiving, by the RNUE, an RRQ message transmitted by a user UE (UU) which is out of coverage of a cell corresponding to the DeNB, the RRQ message being received on the second physical resource for the RRQ message indicated by the information; and
   transmitting, by the RNUE for an accepted RRQ message, a relay response (RRP) message to the UU, by using a third physical resource corresponding to the second physical resource for the RRQ message from the resource pool, the third physical resource being determined based on the second physical resource.

2. The method of claim 1,
   wherein the RBC message is transmitted based on a predetermined condition being satisfied, and
   wherein the predetermined condition comprises at least one of receiving a relay configuration signaling indicator from the DeNB, receiving a reference signal receiving power (RSRP) from the DeNB being less than a set threshold, or receiving a signal from the UU.

3. The method of claim 1,
   wherein the RBC message includes first information configuring a paging message transmission window and second information on a paging message for the second terminal, and wherein the first information indicates a period for the paging message and an offset for the paging message.

4. The method of claim 3,
wherein the RRQ message is received based on the paging message included in the RBC message, and
wherein the paging message is transparently transmitted to the UU.

5. The method of claim 1, wherein the first physical resource for the RBC message and the resource pool are configured by a message received from the DeNB.

6. A method for establishing a relay connection by a user UE (UU) in a device to device (D2D) broadcast communication-based relay network, comprising:
receiving, from a relay node user equipment (RNUE) which is in coverage of a Donor evolved Node B (DeNB), a relay broadcast (RBC) message on a first physical resource from a resource pool, the RBC message including information indicating a second physical resource for a relay request (RRQ) message from the resource pool;
transmitting, by the UU to the RNUE, an RRQ message on the second physical resource indicated by the information; and
receiving, by the UU from the RNUE, a relay response (RRP) message on a third physical resource corresponding to the second physical resource for the RRQ message.

7. The method of claim 6,
wherein the RBC message is received based on a predetermined condition being satisfied, and
wherein the predetermined condition comprises at least one of a relay configuration signaling indicator being received by the RNUE from the DeNB, a reference signal receiving power (RSRP) received by the RNUE from the DeNB being less than a set threshold, or a signal being transmitted to the RNUE.

8. The method of claim 6,
wherein the RBC message includes first information configuring a paging message transmission window and second information on a paging message for the second terminal, and
wherein the first information indicates a period for the paging message and an offset for the paging message.

9. The method of claim 8,
wherein the RRQ message is received based on the paging message included in the RBC message, and
wherein the paging message is transparently received by the RNUE.

10. The method of claim 6, wherein the first physical resource for the RBC message and the resource pool are configured by a message transmitted to the RNUE from the DeNB.

11. A relay node user equipment (RNUE) supporting relay functions in a device to device (D2D) broadcast communication-based relay network and in an in coverage (IC) scene, the RNUE comprising:
a transceiver configured to transmit and receive a signal; and
at least one processor configured to:
transmit a relay broadcast (RBC) message on a first physical resource from a resource pool, the RBC message including information indicating a second physical resource for a relay request (RRQ) message from the resource pool,
receive an RRQ message transmitted by a user UE (UU) which is out of coverage of a cell corresponding to the DeNB, the RRQ message being received on the second physical resource for the RRQ message indicated by the information; and,
transmit, for an accepted RRQ message, a relay response (RRP) message to the UU, by using a third physical resource corresponding to the second physical resource for the RRQ message from the resource pool, the third physical resource being determined based on the second physical resource.

12. The RNUE of claim 11,
wherein the RBC message is transmitted based on a predetermined condition being satisfied, and
wherein the predetermined condition comprises at least one of receiving a relay configuration signaling indicator from the DeNB, receiving a reference signal receiving power (RSRP) from the DeNB being less than a set threshold, or receiving a signal from the UU.

13. The RNUE of claim 11,
wherein the RBC message includes first information configuring a paging message transmission window and second information on a paging message for the second terminal, and
wherein the first information indicates a period for the paging message and an offset for the paging message.

14. The RNUE of claim 13,
wherein the RRQ message is received based on the paging message included in the RBC message, and
wherein the paging message is transparently transmitted to the UU.

15. The RNUE of claim 11, wherein the first physical resource for the RBC message and the resource pool are configured by a message received from the DeNB.

16. A user UE (UU) in a device to device (D2D) broadcast communication-based relay network, the UU comprising:
a transceiver configured to transmit and receive a signal; and
at least one processor configured to:
receive, from a relay node user equipment (RNUE) which is in coverage of a Donor evolved Node B (DeNB), a relay broadcast (RBC) message on a first physical resource from a resource pool, the RBC message including information indicating a second physical resource for a relay request (RRQ) message from the resource pool,
transmit, to the RNUE, an RRQ message on the second physical resource indicated by the information, and
receive, from the RNUE, a relay response (RRP) message on a third physical resource corresponding to the second physical resource for the RRQ message.

17. The UU of claim 16,
wherein the RBC message is received based on a predetermined condition being satisfied, and
wherein the predetermined condition comprises at least one of a relay configuration signaling indicator being received by the RNUE from the DeNB, a reference signal receiving power (RSRP) received by the RNUE from the DeNB being less than a set threshold, or a signal being transmitted to the RNUE.

18. The UU of claim 16,
wherein the RBC message includes first information configuring a paging message transmission window and second information on a paging message for the second terminal, and
wherein the first information indicates a period for the paging message and an offset for the paging message.

19. The UU of claim 18,
wherein the RRQ message is received based on the paging message included in the RBC message, and wherein the paging message is transparently received by the RNUE.

20. The UU of claim 16, wherein the first physical resource for the RBC message and the resource pool are configured by a message transmitted to the RNUE from the DeNB.

* * * * *